United States Patent
Boyd et al.

(10) Patent No.: US 11,392,098 B2
(45) Date of Patent: Jul. 19, 2022

(54) PRIORITY SYSTEMS AND METHODS FOR A ZONING SYSTEM

(71) Applicant: Johnson Controls Technology Company, Auburn Hills, MI (US)

(72) Inventors: Andrew M. Boyd, Wichita, KS (US); Brian D. Rigg, Douglass, KS (US); Shawn A. Hern, Derby, KS (US); Noel A. Grajeda-Trevizo, Newton, KS (US); Cody J. Kaiser, Wichita, KS (US); Tom R. Tasker, Andover, KS (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 172 days.

(21) Appl. No.: 16/186,132

(22) Filed: Nov. 9, 2018

(65) Prior Publication Data

US 2020/0133218 A1 Apr. 30, 2020

Related U.S. Application Data

(60) Provisional application No. 62/752,211, filed on Oct. 29, 2018.

(51) Int. Cl.

| | |
|---|---|
| F24F 11/00 | (2018.01) |
| G05B 19/042 | (2006.01) |
| F24F 11/52 | (2018.01) |
| F24F 11/56 | (2018.01) |
| F24F 11/64 | (2018.01) |
| F24F 11/72 | (2018.01) |
| F24F 11/65 | (2018.01) |
| F24F 120/12 | (2018.01) |
| F24F 120/20 | (2018.01) |

(52) U.S. Cl.
CPC ............ *G05B 19/042* (2013.01); *F24F 11/52* (2018.01); *F24F 11/56* (2018.01); *F24F 11/64* (2018.01); *F24F 11/65* (2018.01); *F24F 11/72* (2018.01); *F24F 2120/12* (2018.01); *F24F 2120/20* (2018.01); *G05B 2219/2614* (2013.01)

(58) Field of Classification Search
None
See application file for complete search history.

(56) References Cited

U.S. PATENT DOCUMENTS

| | | | |
|---|---|---|---|
| 7,156,316 | B2 | 1/2007 | Kates |
| 8,695,888 | B2 | 4/2014 | Kates |
| 9,103,558 | B2 | 8/2015 | Pine et al. |
| 9,303,889 | B2 | 4/2016 | Kates |
| 9,353,963 | B2 | 5/2016 | Kates |
| 9,353,964 | B2 | 5/2016 | Kates |
| 9,477,239 | B2 | 10/2016 | Bergman et al. |
| 9,618,223 | B2 | 4/2017 | Kates |
| 2002/0134849 | A1 | 9/2002 | Disser |
| 2013/0085609 | A1 | 4/2013 | Barker |

(Continued)

*Primary Examiner* — Paul B Yanchus, III
(74) *Attorney, Agent, or Firm* — Fletcher Yoder, P.C.

(57) ABSTRACT

The present disclosure relates to a heating, ventilation, and/or air conditioning (HVAC) system including a controller configured to detect a presence of an occupant in a zone of a plurality of zones. The controller is also configured to determine a priority level of the occupant and control operation of the HVAC system to prioritize supply of conditioned air to the zone of the plurality of zones over remaining zones of the plurality of zones based on the priority level of the occupant.

20 Claims, 7 Drawing Sheets

(56) References Cited

U.S. PATENT DOCUMENTS

| | | | |
|---|---|---|---|
| 2013/0166073 A1* | 6/2013 | Pine | F24F 11/30 |
| | | | 700/276 |
| 2014/0158338 A1 | 6/2014 | Kates | |
| 2014/0316582 A1 | 10/2014 | Berg-Sonne et al. | |
| 2016/0040902 A1* | 2/2016 | Shah | G01S 5/021 |
| | | | 700/277 |
| 2017/0030605 A1 | 2/2017 | Heller et al. | |
| 2017/0211838 A1* | 7/2017 | Child | G05B 15/02 |
| 2017/0370604 A1* | 12/2017 | Carey | F24F 11/62 |
| 2018/0004178 A1 | 1/2018 | Haines et al. | |
| 2018/0191197 A1 | 7/2018 | Carr et al. | |
| 2019/0171171 A1* | 6/2019 | Verteletskyi | G06Q 50/163 |
| 2019/0390865 A1* | 12/2019 | Denton | F24F 3/0442 |

* cited by examiner

PRIORITY SYSTEMS AND METHODS FOR A ZONING SYSTEM

CROSS-REFERENCE TO RELATED APPLICATIONS

This application claims priority from and the benefit of U.S. Provisional Application Ser. No. 62/752,211, entitled "PRIORITY SYSTEMS AND METHODS FOR A ZONING SYSTEM," filed Oct. 29, 2018, which is herein incorporated by reference in its entirety for all purposes.

This disclosure relates generally to heating, ventilation, and/or air conditioning (HVAC) systems. Specifically, the present disclosure relates to a control system for a zoned HVAC system.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to control certain environmental conditions, such as temperature, within a building, home, or other structure. A zoned HVAC system generally includes dampers disposed within ductwork forming an air distribution system of a building. The dampers cooperate to regulate air flow within the ductwork and redirect air to specific areas or zones of the building based on a cooling demand of the zones. Accordingly, the dampers facilitate the designation of customized temperature zones throughout the building. That is, the zoned HVAC system may deliver suitably conditioned air to particular zones of the building in order to adequately meet and/or approach a demand for conditioned air in these zones. Unfortunately, conventional zoned HVAC systems typically condition zones of a building without regard to occupancy within the zones.

SUMMARY

The present disclosure relates to a heating, ventilation, and/or air conditioning (HVAC) system including a controller configured to detect a presence of an occupant in a zone of a plurality of zones. The controller is also configured to determine a priority level of the occupant and control operation of the HVAC system to prioritize supply of conditioned air to the zone of the plurality of zones over remaining zones of the plurality of zones based on the priority level of the occupant.

The present disclosure also relates to a heating, ventilation, and/or air conditioning (HVAC) system including a controller configured to detect a presence of a plurality of occupants in a zone of a plurality of zones, determine a priority level of each occupant of the plurality of occupants, and determine a priority occupant of the plurality of occupants having a highest priority level among the plurality of occupants. The controller is also configured to control operation of the HVAC system to prioritize supply of conditioned air to the zone of the plurality of zones based on a preferred climate setting of the priority occupant.

The present disclosure also relates to a heating, ventilation, and/or air conditioning (HVAC) system including a controller configured to detect a presence of a first occupant in a first zone of a plurality of zones, detect a presence of a second occupant in a second zone of the plurality of zones, and determine a first priority level of the first occupant and a second priority level of the second occupant based on an identification of the first occupant and an identification of the second occupant. The controller is also configured to control operation of the HVAC system to supply conditioned air to the first zone at a first flow rate and supply conditioned air to the second zone at a second flow rate in response to determining that the first priority level exceeds the second priority level, where the first flow rate is greater than the second flow rate.

BRIEF DESCRIPTION OF THE DRAWINGS

Various aspects of this disclosure may be better understood upon reading the following detailed description and upon reference to the drawings in which.

DETAILED DESCRIPTION

Figure 1:
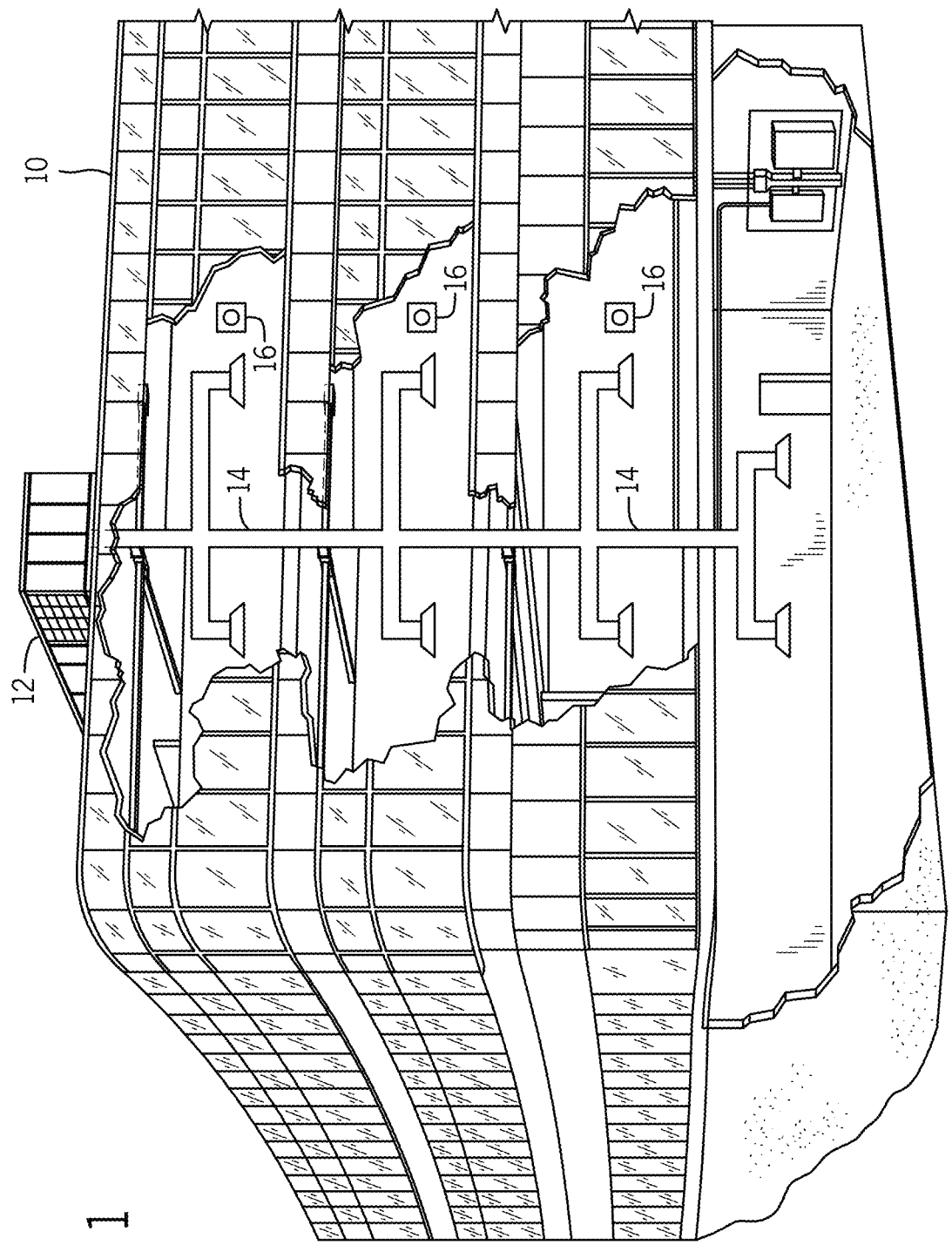
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, certain HVAC systems may include zoned HVAC systems configured to concurrently regulate separate climate conditions within a plurality of separate spaces or rooms of a building or other structure. These previously designated spaces or rooms may form zones of the zoned HVAC system. Zoned HVAC systems often utilize a control system to control the operation of various air conditioning devices and/or equipment that enables the independent adjustment of climate parameters within each of the zones. For example, a zone controller of the HVAC system may be configured to adjust devices of the HVAC system to maintain an air temperature within each zone at a desired setting or within a desired range. Accordingly, the zone controller enables the individual management of climate parameters within the zones.

Zoned HVAC systems generally include a plurality of ducts forming an air distribution system throughout the building. The ducts may include return air ducts and supply air ducts that extend between and fluidly couple air conditioning components of the HVAC system, such as an evaporator and/or a furnace, to the zones of the building. More specifically, each zone may be associated with a respective return air duct and a respective supply air duct that enables the HVAC system to receive air from and supply air to a particular zone. Accordingly, the HVAC system may distribute a supply of conditioned air amongst the zones of the building. In many cases, conventional, zoned HVAC systems provide conditioned air to zones calling for heating or cooling without regard to an occupancy within these zones. For example, conventional, zoned HVAC systems typically distribute a conditioned air supply to unoccupied zones of the building at a flow rate generally equal to a flow rate of conditioned air supplied to occupied zones. Unfortunately, evenly distributing this conditioned air supply amongst unoccupied and occupied zones may lessen a portion of the conditioned air supply directed to the occupied zones, thereby increasing a time period involved in conditioning the occupied zones to a desired target temperature. Accordingly, a considerable time period may lapse before an air temperature within the occupied zones approaches the desired target temperature specified by occupants residing therein. Moreover, typical zoned HVAC systems often condition the zones of the building to a universal, predetermined temperature set point regardless of where the occupant or occupants are currently present in the zones. In this manner, certain zones of the building may be conditioned to a temperature value this is above or below a temperature value most comfortable to the occupant(s).

It is now recognized that it may be desirable to supply conditioned air to occupied zones of a building at a different flow rate compared to air supplied to zones of the building that are unoccupied. For example, the zoned HVAC system may supply conditioned air to occupied zones of a building at an elevated rate compared to a flow rate of air supplied to unoccupied zones of the building. Accordingly, the zoned HVAC system may reduce a time period involved in conditioning the occupied zones to a desired temperature set point specified by the occupants of the building. Further, it is recognized that automatically adjusting a temperature set point of a particular zone based on the occupant(s) currently present within that zone may enhance a comfort level of the occupant(s). That is, the HVAC system may be configured to detect a particular occupant within a zone and, as a result, condition the zone to a preferred temperature setting of the occupant without prompting input from the occupant.

With the forgoing in mind, embodiments of the present disclosure are directed to a control system configured to detect and identify occupants within zones of a building and to adjust operating parameters of a zoned HVAC system to prioritize conditioning of the zones having the occupants. More specifically, the control system is configured to identify certain higher priority occupants within the zones and to condition the zones where the higher priority occupants are present in accordance with previously-determined climate preferences of the high priority occupants.

For example, the control system may include a zone controller that is communicatively coupled to various HVAC equipment of the zoned HVAC system, such as one or more dampers, fans or blowers, thermostats, louvers, or any other suitable HVAC equipment of the HVAC system. The zone controller may include an input device or a display device that enables an occupant of the building to interact with and control certain features or operations of the control system. In some embodiments, during initial configuration of the control system and/or the zoned HVAC system, occupants of the building may utilize the input device to generate respective user profiles, which are stored within a memory device of the control system. The user profiles are unique to each occupant and store preferred climate preferences of the occupants including, for example, an indoor temperature most comfortable to the occupants.

The control system may associate detection of an electronic device or a non-electronic device of each occupant with the user profile of the occupant. For example, the control system may include suitable hardware that enables an occupant to register a mobile electronic device, a cellular phone, a tablet, a laptop, a key fob, a magnetic strip card, or the like, with the control system. These registered electronic and/or non-electronic devices are stored within the respective user profiles of the occupants. As described in greater detail herein, upon registration of such devices and/or items, the control system may subsequently identify a particular occupant based on the detection and identification of the electronic and/or non-electronic device(s) carried by the occupant.

One or more system administrators may be assigned to the control system during initial installation of the control system within the building. The system administrators may have access to some or all of the information stored with the user profiles of the occupants and may have the ability to overwrite any of the information contained therein. In particular, the control system enables the system administrators to assign unique priority levels to occupants having a user profile. The priority levels of the occupants may be non-repeating, and thus, enable the sequential ranking of the occupants relative to one another. For example, an occupant having a high seniority status may be assigned a relatively high priority level by a system administrator. Conversely, the system administrator may assign a relatively low priority level to an occupant having a lower seniority status.

During operation of the zoned HVAC system, the control system may receive feedback from occupancy sensors disposed within the zones that enable the control system to identify and determine a location of the occupants within the building. For example, the occupancy sensors may include external or integrated sensors that are configured to detect the registered electronic or non-electronic devices carried by the occupants. Accordingly, the control system may identify the occupants upon the identification the electronic or non-electronic devices associated with the occupants. That is, the control system may identify the zone in which each of the occupants is currently present.

The control system may subsequently determine which zone contains an occupant having the highest priority level among the registered occupants currently residing within the building. That is, the control system may reference the user profiles of the identified occupants stored in the memory of the control system to determine which of the identified occupants is associated with the highest priority level. For clarity, an occupant in the building having the highest relative priority level will be referred to herein as the "priority occupant," and the zone containing this highest priority occupant will be referred to herein as the "priority zone." Upon identification of the priority zone, the control system may control operation of the HVAC system to prioritize the supply of conditioned air to the priority zone, thereby enhancing or accelerating a rate at which the priority zone is heated or cooled. For example, the control system may adjust operation of the HVAC components of the HVAC system to reduce a flow rate of conditioned air supplied to non-priority zones or, in other words, zones that do not contain the priority occupant. As a result, a greater portion of a conditioned air produced by the HVAC system may be provided to the priority zone. The control system instructs the HVAC system to condition the priority zone in accordance with the preferred climate settings stored in the user profile of the priority occupant. Accordingly, the control system may ensure that a target temperature set point of a zone having the priority occupant is met prior to operating the HVAC system to achieve a target temperature set point of one or more of the non-priority zones. The control system may monitor a position of the priority occupant within the building and may adjust air conditioning operations of the HVAC system to prioritize air conditioning of the zone currently occupied by the priority occupant.

In some embodiments, the control system may additionally condition the non-priority zones in accordance with preferred climate settings of respective occupants having a next highest priority level within the non-priority zones. In other words, the control system may be configured to condition a non-priority zone to a preferred climate setting of the highest priority occupant identified with that non-priority zone. Further, the control system may reduce, or substantially block, conditioned air flow to certain zones within the building that are identified as unoccupied or vacant. Accordingly, the control system may prioritize conditioning of the occupied zones of the building and, in particular, prioritize conditioning of zones having the priority occupants. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
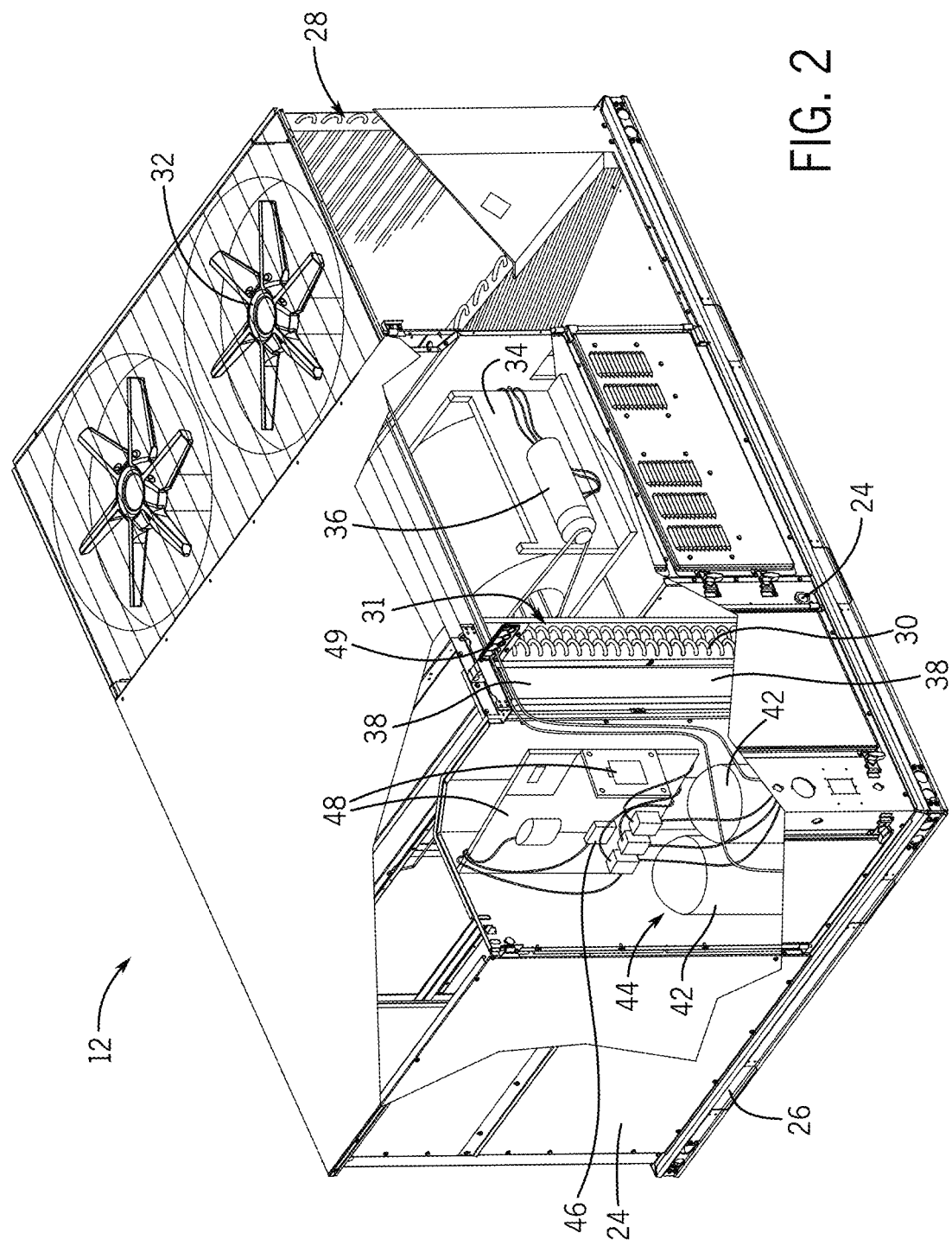
FIG. 2 is a perspective view of an embodiment of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
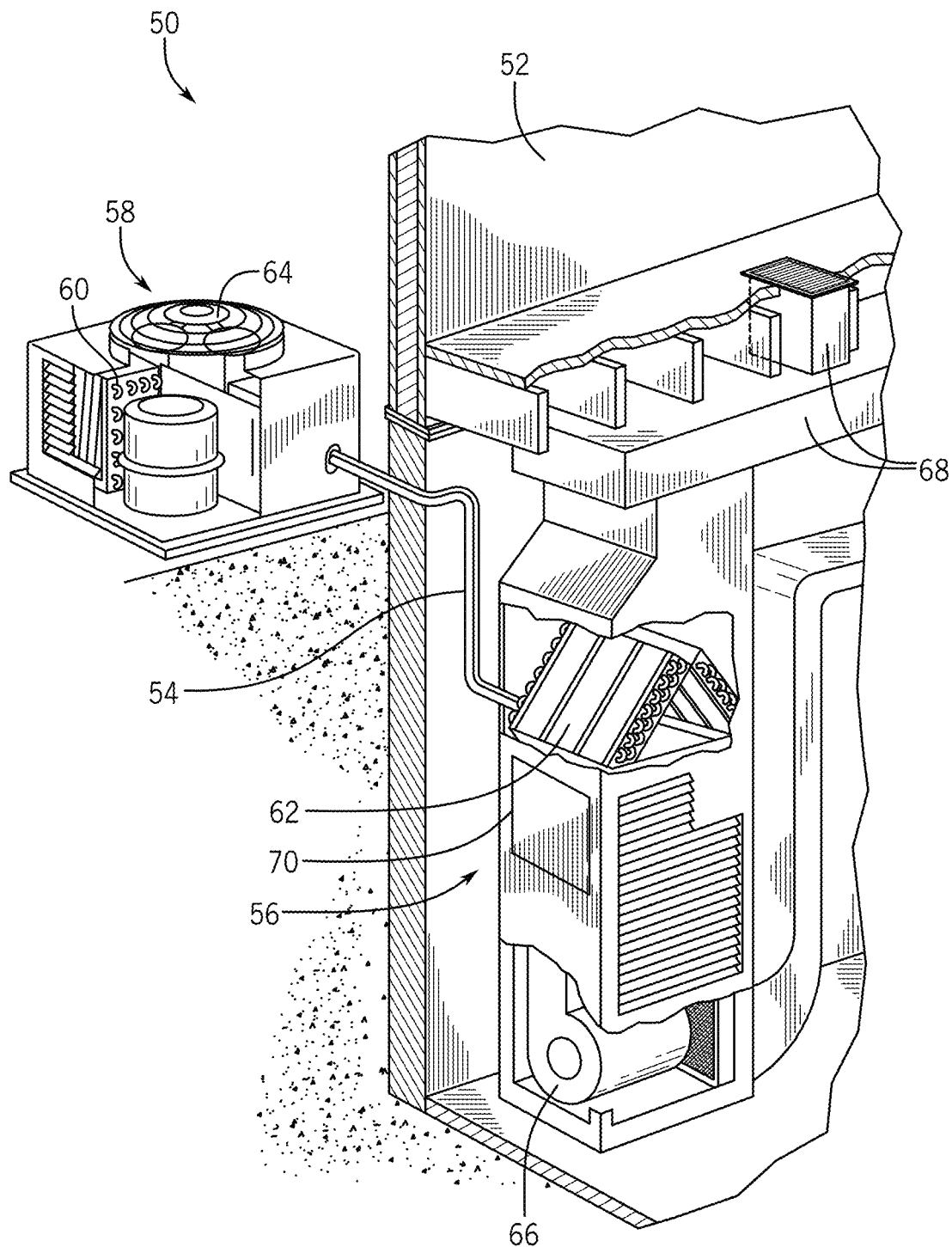
FIG. 3 is a perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
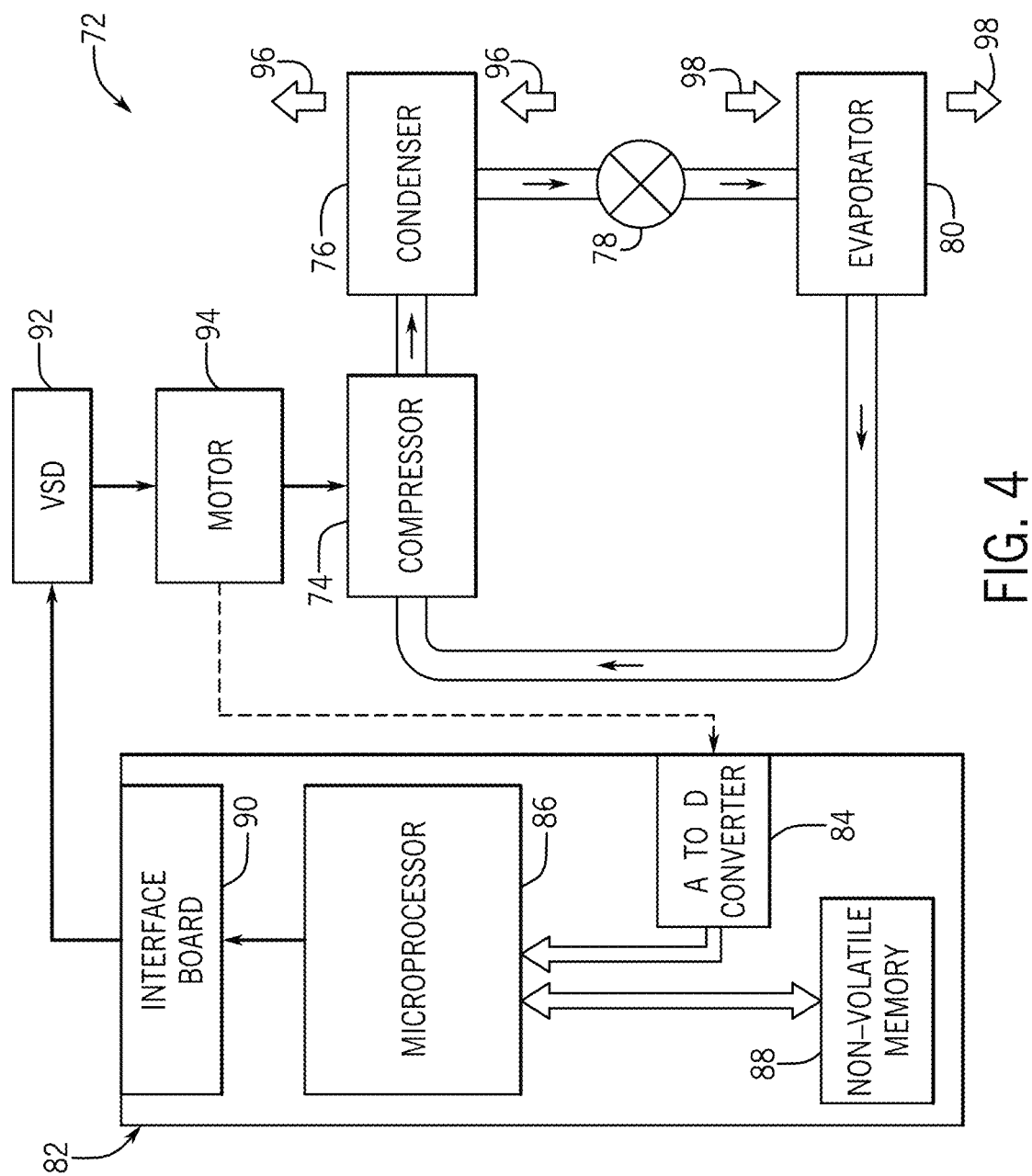
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. Accordingly, it should be noted that the embodiments of the present disclosure may include features of the description above. As will be discussed in more detail below, embodiments of the present disclosure include a zoned HVAC system having a control system, such as the control device 16, which may dynamically adjust an air flow rate of conditioned air supplied to zones serviced by the zoned HVAC system based on an occupancy within the zones. More specifically, the control system is configured to prioritize air flow to certain zones of the HVAC system based on an identification of particular occupants within these zones.

Figure 5:
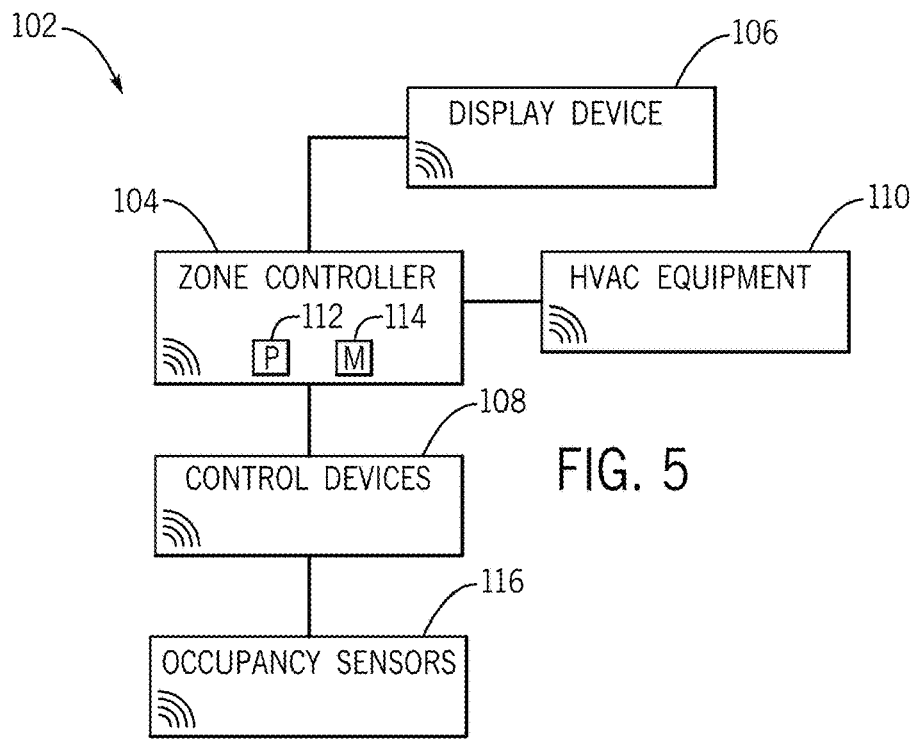
FIG. 5 is a block diagram of an embodiment of a control system that may be used to control the HVAC system of FIGS. 1-4, in accordance with an aspect of the present disclosure.

With the foregoing in mind, FIG. 5 is a block diagram of a control system 102 that may be configured to operate any of the HVAC systems of FIG. 1-4 or any other suitable zoned HVAC system associated with the building 10 or another structure. In the illustrated embodiment, the control system 102 includes a zone controller 104, a display device 106 or an input device, and one or more control devices 108, which may be configured to cooperatively control HVAC equipment 110 of an HVAC system. As discussed in detail below, the HVAC equipment 110 may include one or more dampers, fans or blowers, thermostats, louvers, or any other suitable HVAC equipment that may be included in any of the aforementioned HVAC systems.

The zone controller 104 includes a processor 112 and a memory device 114. The processor 112 may be used to execute software, such as software for providing commands and/or data to the control system 102, and so forth. Moreover, the processor 112 may include multiple microprocessors, one or more "general-purpose" microprocessors, one or more special-purpose microprocessors, and/or one or more application specific integrated circuits (ASICS), or some combination thereof. For example, upon installation of the software or other executable instructions on the processor 112, the processor 112 may become a special purpose processor configured to improve operation of an HVAC system and/or the control system 102 using the techniques described herein. In some embodiments, the processor 112 may include one or more reduced instruction set (RISC) processors. The memory device 114 may include a volatile memory, such as RAM, and/or a nonvolatile memory, such as ROM. The memory device 114 may store a variety of information and may be used for various purposes. For example, the memory device 114 may store processor-executable instructions for the processor 112 to execute, such as instructions for providing commands and/or data to the control system 102 and/or components of an HVAC system associated with the control system 102.

As described in greater detail herein, in certain embodiments, the processor 112 may generate and display a graphical user interface (GUI) on the display device 106. The GUI enables an occupant or other user to input commands into the control system 102 and control operation of the control system 102. In some embodiments, the display device 106 may be a component of the zone controller 104, a component of one of the control devices 108, or a control panel screen of an HVAC unit. In other embodiments, the display device 106 may be an external device communicatively coupled to the control system 102. For example, the display device 106 may be a tablet, a mobile device, a laptop computer, a personal computer, a wearable device, and/or the like. The display device 106 may be communicatively coupled to the components of the control system 102 via various wired and/or wired communication devices.

For example, the zone controller 104, the display device 106, the control devices 108, and/or certain of the HVAC equipment 110 may each have a communication component that facilitates wired or wireless communication between the zone controller 104, the display device 106, the control devices 108, and/or the HVAC equipment 110 via a network. Accordingly, individual components of the control system 102 may communicate with one another via the network. The communication components may include a network interface that enables the zone controller 104, the display device 106, the control devices 108, and/or the HVAC equipment 110 to communicate via various protocols such as EtherNet/IP, ControlNet, DeviceNet, or any other communication network protocol. Alternatively, the communication components may enable the zone controller 104, the display device 106, the control devices 108, and/or the HVAC equipment 110 to communicate via various wireless communication protocols such as Wi-Fi, mobile telecommunications technology, Bluetooth®, near-field communications technology, and the like. As such, the zone controller 104, the display device 106, the control devices 108, and/or the HVAC equipment 110 may wirelessly communicate data between each other.

As shown in the illustrated embodiment of FIG. 5, the control system 102 also includes one or more occupancy sensors 116 that may be communicatively coupled to the control devices 108 and/or the zone controller 104 using any of the aforementioned communication components. As described in detail below, the occupancy sensors 116 are configured to provide the zone controller 104 with feedback indicative of an occupancy within zones of the building 10. In some embodiments, the occupancy sensors 116 may include passive infrared sensors, ultrasonic sensors, audio sensors, or the like, which enable the control system 102 to detect an occupant within a particular zone of the building 10. In certain embodiments, the occupancy sensors 116 may be separate components of the control system 102. However, in other embodiments, the occupancy sensors 116 may be integrated with the zone controller 104, the display device 106, and/or the control devices 108.

Figure 6:
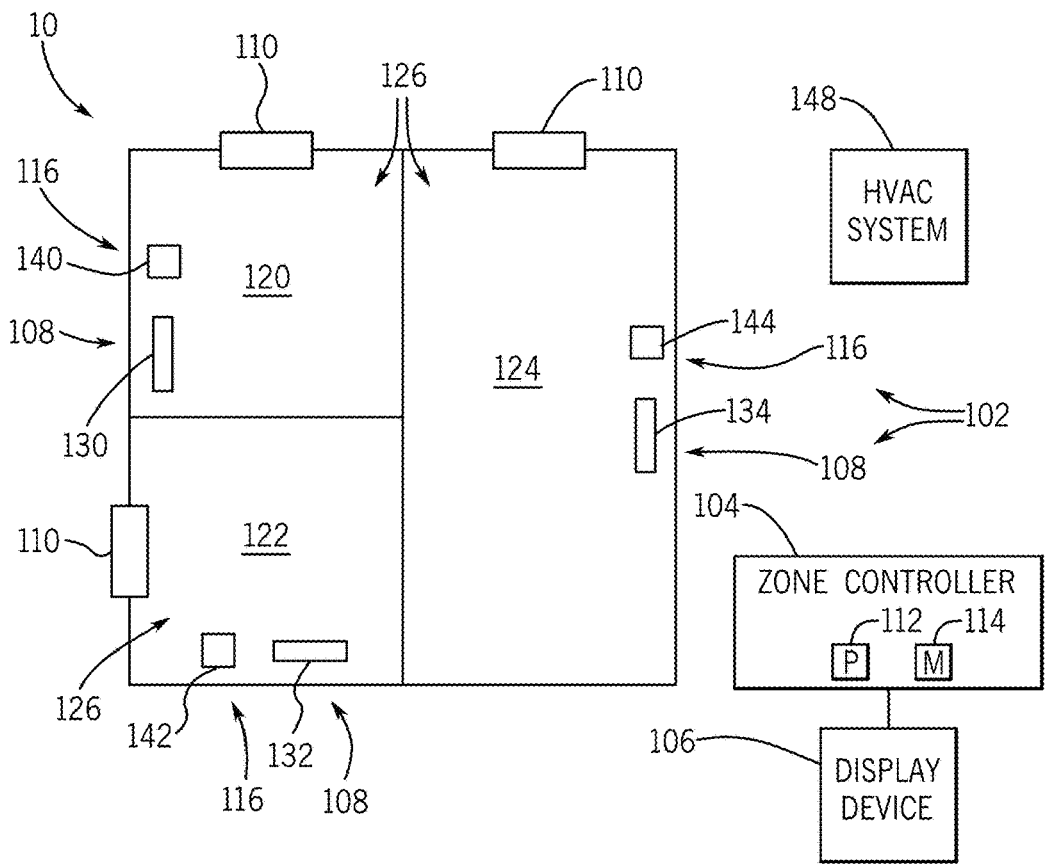
FIG. 6 is a schematic diagram of an embodiment of a building having HVAC equipment that may be controlled by a control system, in accordance with an aspect of the present disclosure.

FIG. 6 is a schematic of an embodiment of the building 10 serviced by the control system 102. As shown in the illustrated embodiment, the building 10 includes a first zone 120, a second zone 122, and a third zone 124, which are collectively referred to herein as zones 126. The zones 126 may be associated with a respective room or space within the building 10. However, it should be noted that in other embodiments, each of the zones 126 may include 1, 2, 3, 4, 5, 6, or more than 6 rooms. The control devices 108 may include a first control device 130, a second control device 132, and a third control device 134, which are respectively disposed within the first zone 120, the second zone 122, and the third zone 124. Accordingly, the control devices 108 may individually monitor climate parameters, such as temperature, within each of the zones 126. The zones 126 may also include a respective one of the occupancy sensors 116. That is, the first, the second, and the third zones 120, 122, and 124 may respectively include a first occupancy sensor 140, a second occupancy sensor 142, and a third occupancy sensor 144, as shown in the illustrated embodiment of FIG. 6.

The zones 126 are supplied within conditioned air generated by an HVAC system 148. It should be appreciated that the HVAC system 148 may include any of the HVAC systems of FIG. 1-4, or any other suitable HVAC system. The HVAC system 148 includes the HVAC equipment 110, which enables the HVAC system 148 to supply conditioned air to one or more of the zones 126. More specifically, the HVAC equipment 110 enables the HVAC system 148 to concurrently regulate climate parameters within each of the zones 126 of the building 10.

As noted above, the control system 102 may control operation of an HVAC system, such as the HVAC system 148, to prioritize air flow to certain of the zones 126 based on an identification of particular occupants within the zones 126. That is, the control system 102 may enhance a flow rate of conditioned air supplied to zones 126 having a high priority occupant and may reduce a flow rate of air supplied to zones 126 that are vacant or have occupants of a lower priority level. In addition, the control system 102 may automatically adjust operation of the HVAC equipment 110 to condition the first, the second, and/or the third zones 120, 122, and/or 124 in accordance with predetermined climate preferences of high priority occupants within these zones 126. To enable the control system 102 to detect and differentiate the high priority occupants from other occupants within the building 10, the control system 102 may reference a user identification database that is stored within, for example, the memory device 114 of the zone controller 104. The user identification data base contains user profiles of occupants that have been previously registered with the control system 102. As discussed in detail below, the user profiles contain indentation information that enables the control system 102 to recognize and identify these occupants and determine a priority level of each of the occupants. In this manner, the control system 102 may instruct the HVAC system 148 to prioritize supplying conditioned air to certain of the zones 126 having the detected high priority occupants.

Figure 7:
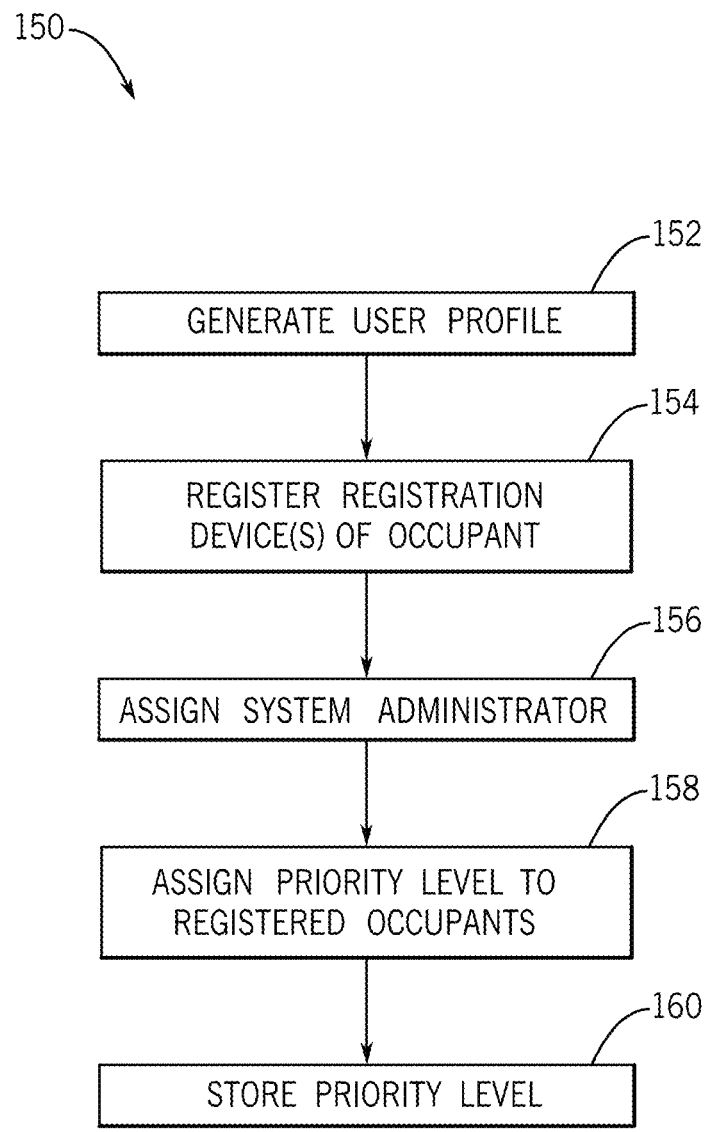
FIG. 7 is a flow diagram of an embodiment of a process for generating a user profile using a control system, in accordance with an aspect of the present disclosure.

With the foregoing in mind, FIG. 7 is a flow diagram of an embodiment of a process 150 that may be used to generate the user identification database. It may be appreciated that one or more of the steps discussed below may be performed during installation or initial set-up of the control system 102 and/or the HVAC system 148. In other embodiments, certain of the steps may be performed after the control system 102 is installed and operating within the building 10. For example, the control system 102 may gradually receive new and/or updated user profiles that may be added to the occupancy identification database over time. Moreover, it should be noted that the steps of the process 150 discussed below may be performed in any suitable order and are not limited to the order shown in the illustrated embodiment of FIG. 7.

The process 150 may begin with generating user profiles of individual occupants, as indicated by step 152. For example, the GUI of the display device 106 may prompt an occupant to furnish registration information during an initial encounter between the occupant and the display device 106. That is, the GUI, via a touchscreen of the display device 106, may possess one or more different interaction points through which the occupant may interact with and/or input data into the control system 102. Accordingly, the control system 102 may receive a user input from the display device 106, which is subsequently stored in the user profile of the occupant. Additionally or alternatively, the control system 102 may be communicatively coupled to any other suitable input device configured to receive a user input from an occupant, such as a keyboard, a tracking pad, a microphone, a mouse, or the like.

In some embodiments, the GUI may prompt the occupant to input preferred climate settings that are most comfortable to the occupant. For example, the GUI may prompt the occupant to specify a preferred indoor temperature within the building 10 and/or the zones 126. Accordingly, the preferred temperature set point of the occupant may be stored in the memory device 114 of the control system 102 and may be associated with the user profile of the occupant. Additionally or otherwise, the GUI may enable the occupant to input preferred lighting levels, fan speed levels, audio levels, or any other controllable parameters of the zones 126, the HVAC system 148, and/or the control system 102.

As indicated by step 154, the GUI may prompt the occupant to register certain electronic or non-electronic devices, also referred to herein as registration devices, which may be carried by the occupant. For example, in some embodiments, the GUI may request permission to install a mobile application on an electronic device carried by the occupant, such as a tablet, a mobile device, a laptop computer, a personal computer, a wearable device, or the like. The control system 102, via the mobile application, may associate or link the electronic device of the occupant with the user profile of that particular occupant. As discussed in greater detail herein, the control system 102 may be configured to detect the electronic device in a subsequent encounter between the occupant and the control system 102, and thus, identify the occupant associated with this electronic device.

In some embodiments, the control system 102 may associate non-electronic devices including a key fob, a magnetic strip card, or a scannable bar code with the occupant. Additionally or alternatively, the control system 102 may provide the occupant with an identification pin or passcode via the display device 106. The identification pin may be unique to each occupant and may thereby enable the control system 102 to differentiate multiple occupants from one another. That is, the control system 102 may identify a particular occupant in a subsequent encounter after the occupant authenticates him or herself via the identification pin. It should be noted that the control system 102 may register a particular occupant via a combination of the techniques discussed above or via any other suitable technique that may be used to register a particular occupant within the user identification database of the control system 102.

Continuing through the embodiment of the process 150 illustrated in FIG. 7, the process 150 includes assigning a system administrator to the control system 102, as indicated by step 156. The system administrator may have access to all of the user profiles in the occupancy identification database and may adjust or override certain information stored in the user profiles. In particular, the system administrator may assign priority levels to each of the occupants registered in user identification database, as indicated by step 158. As noted above, these priority levels may correspond to a seniority level of the occupants, an occupational title of the occupants, an age of the occupants, or any other suitable parameter(s) by which the occupants may be distinguished from one another. In some embodiments, the priority levels may include non-repeating integer values that are stored within the user profiles. That is, each registered occupant may be assigned a unique priority level that is different than a priority level of other registered occupants. Larger integer values may correspond to occupants having a higher priority than occupants associated with lower integer values. However, it should be noted that the priority levels may be generated via any other suitable numerical, alphabetic, or alphanumeric character code in other embodiments of the control system 102. Moreover, in certain embodiments, multiple occupants may be associated with the same priority level. In any case, it is important to note that an occupant without administrative privileges or, in other words, an occupant that is not a system administrator, may not adjust his or her priority level and/or the priority level of other occupants registered in the user identification database. The priority level of each registered occupant is stored within, for example, the memory device 114 of the control system 102, as indicated by step 160.

Figure 8:
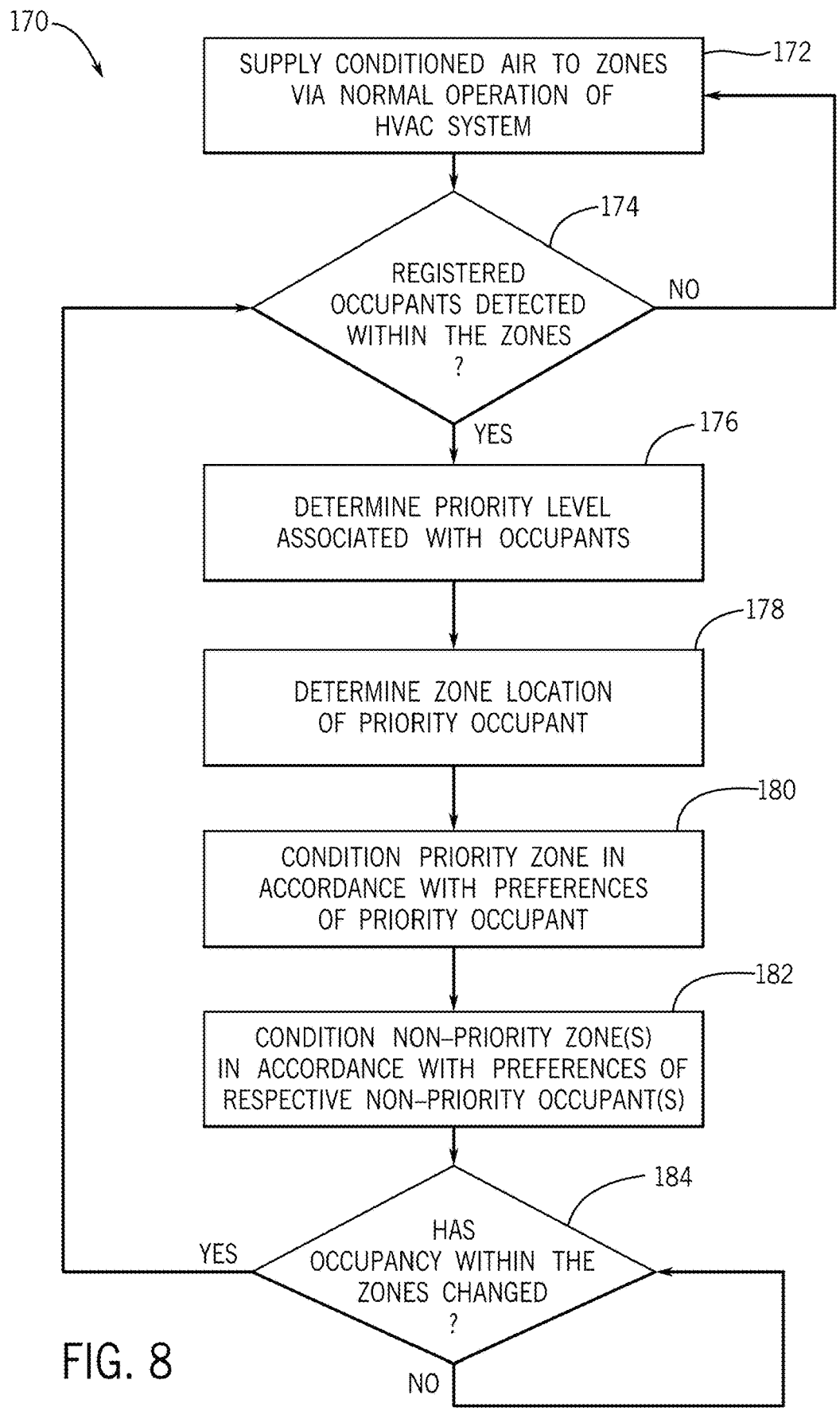
FIG. 8 is a flow diagram of an embodiment of a process of operating a zoned HVAC system using a control system, in accordance with an aspect of the present disclosure.

FIG. 8 is a flow diagram of an embodiment of a process 170 of operating the HVAC system 148 via the control system 102. It should be noted that one or more of the steps of the process 170 may be implemented using routines or code stored in the memory device 114 and may be executed by the processor 112 of the zone controller 104. Moreover, the steps of the process 170 may be executed in any suitable order and are not limited to the order shown in the illustrated embodiment of FIG. 8. The process 170 may begin with operating the HVAC system 148 to supply conditioned air the zones 126 of the building 10, as indicated by step 172. For example, the zone controller 104 may receive feedback from the control devices 108 indicative of respective actual air temperature within the zones 126. If an actual air temperature within a zone deviates from a predetermined target air temperature of that zone 126 by a threshold amount, the zone controller 104 may instruct the HVAC equipment 110 to increase or decrease a flow rate of conditioned air supplied to this zone 126. Accordingly, the control system 102 may maintain an actual air temperature within the zones 126 within a threshold range of respective predetermined target air temperatures.

As shown in the illustrated embodiment of FIG. 8, the process 170 includes detecting whether registered occupants are present within the zones 126, as indicated by step 174. That is, the zone controller 104 may determine whether occupants within the zones 126 are registered within the user identification database of the control system 102. For example, the zone controller 104 may receive continuous or intermittent feedback from the occupancy sensors 116 that is indicative of an occupancy within the first zone 120, the second zone 122, and/or the third zone 124. Upon detection of occupants within the zones 126, the zone controller 104 may determine whether any of the detected occupants carry electronic or non-electric devices that are associated with a particular occupant stored within the occupancy identification database. However, it should be noted that in some embodiments, detecting the presence of the occupant may be indicative of detecting the presence of an electronic or non-electronic device associated with the occupant.

For example, the occupancy sensors 116 may include integrated or external detection devices, such as Wi-Fi telecommunication sensors, Bluetooth® sensors, or near-field communication sensors, which are configured to detect electronic signals from electronic devices carried by the detected occupants. The zone controller 104 compares the detected electronic devices to the electronic devices previously registered in the user identification database. Accordingly, the zone controller 104 may determine whether the electronic devices correspond to a registered or unregistered occupant. In other words, the zone controller 104 may determine whether an occupant is associated with a previously generated user profile stored in the occupancy identification database.

In some embodiments, the occupancy sensors 116 include additional detection sensors that are integrated with or communicatively coupled to the occupancy sensor 116 and enable the occupancy sensors 116 to detect other electronic or non-electronic devices of the occupants. For example, such detections sensors may include card readers that are configured to receive and/or read a magnetic strip card, a scannable bar code, and/or identification (ID) card of an occupant. In some embodiments, the detection sensors may include specialized sensors configured to detect a key fob of an occupant. In further embodiments, the occupancy sensors 116 may include a key pad or other suitable input device, such as the display device 106, by which an occupant may enter his or her previously assigned identification pin or code. Accordingly, the occupancy sensors 116 may enable the control system 102 to detect an occupant within the zones 126 and identify whether the occupant is a registered or unregistered occupant. It should be appreciated that these detection sensors may be formed integrally within the occupancy sensors 116 or include separate sensors that are communicatively coupled to the occupancy sensors 116 via any of the communication protocols and devices discussed above.

If the zone controller 104 determines that none of the detected occupants are registered within the user identification database, the zone controller 104 may continue to supply conditioned air to the zones 126 via normal operation of the HVAC system 148, in accordance with the step 172. That is, even if occupants are detected within the zones 126, if these occupants are not identified as a previously registered occupants, the zone controller 104 continues normal HVAC operations.

Upon identifying the presence of one or more registered occupants within the zones 126, the zone controller 104 may subsequently determine the priority level associated with the registered occupants, as indicated by step 176. That is, the zone controller 104 evaluates the priority levels stored within the user profile of the identified occupants. In this manner, the zone controller 104 may compare the priority levels of the registered occupants to determine the occupant having the highest priority level among the registered occupants currently located within the building 10. As noted above, the occupant having the highest priority level within the building 10 will be referred to herein as the "priority occupant." Upon identification of the priority occupant, the zone controller 104 determines a zone location of the priority occupant, as indicated by step 178. In other words, in the embodiment of FIG. 6, the zone controller 104 evaluates feedback acquired by the occupancy sensors 116 to determine whether the priority occupant is currently located within the first zone 120, the second zone 122, or the third zone 124 of the building 10. For clarity, the zone 126 having the highest priority occupant amongst all remaining zones 126 of the building 10 is referred to herein as the "priority zone."

As indicated by step 180, upon determining the zone location of the priority occupant, the control system 102 instructs the HVAC system 148 to condition the priority zone in accordance with the previously-stored climate preferences of the priority occupant. For example, the control system 102 may automatically instruct the HVAC system 148 to condition the priority zone to the preferred temperature value stored in the user profile of the priority occupant. In addition, the control system 102 may prioritize conditioning the priority zone over other zones 126 of the building 10. For example, if the first zone 120 is determined as the priority zone, the control system 102 may instruct the HVAC equipment 110 to increase a flow rate of conditioned air supplied to the first zone 120 and decrease a flow rate of conditioned air supplied to the second and the third zones 122 and 124. That is, the control system 102 may transition supply air damper(s) of the first zone 120 to an open position and/or transition the supply air damper(s) of the second and third zones 122 and 124 to partially closed positions, thereby reducing a quantity of conditioned air supplied to these zones 126. In addition, the control system 102 may increase an operational speed of one or more supply air fans that may be disposed within the supply air ducts of the first zone 120 and/or decrease an operational speed of one or more supply air fans that may be disposed within the supply air ducts the second zone 122 and the third zone 124. In this manner, the control system 102 may adjust a distribution of a conditioned air supply generated by the HVAC system 148 to prioritize conditioning of the priority zone. Specifically, the control system 102 may increase a portion of a conditioned air that is directed to the priority zone, such as the first zone 120, and/or reduce a portion of this conditioned air supply that is directed to non-priority zones, such as the second and third zones 122 and 124. For clarity, the term "non-priority zone" refers to any zone 126 within the building 10 that does not include the priority occupant. In other words, the non-priority zones may include all zones 126 within the building 10 other than the priority zone.

In certain embodiments, the control system 102 may substantially block a flow of conditioned air the non-priority zones. For example, if the control system 102 determines that the priority occupant is currently located within the first zone 120, the control system 102 may instruct the HVAC equipment 110 to substantially block the flow of conditioned air to the second zone 122 and the third zone 124 by, for example, closing the supply air dampers associated with the second and third zones 122 and 124. Therefore, substantially all of the conditioned air supplied by the HVAC system 148 may be directed toward the priority zone. Accordingly, the control system 102 may prioritize conditioning of the priority zone and significantly reduce a time period involved in conditioning the priority zone to the preferred climate settings of the priority occupant.

In some embodiments, the process 170 includes conditioning the non-priority zones of the building 10 in accordance with preferred climate preferences of respective highest priority occupants within the non-priority zones, as indicated by step 182. For example, for each non-priority zone, the control system 102 may identify an occupant having the highest relative priority level among other occupants within that same non-priority zone. A non-priority zone having an occupant with the highest relative priority level amongst the non-priority zones will be referred the herein as the "secondary priority zone," and this occupant will be referred to herein as the "secondary priority occupant." A non-priority zone having an occupant of the second highest relative priority level amongst all non-priority zones will be referred the herein as the "tertiary priority zone," and this occupant will be referred to herein as the "tertiary priority occupant." The control system 102 may repeat this process for all zones of the building 10 to determine and rank a relative priority of the remaining zones. In this manner, the control system 102 may identify the priority occupant, the secondary priority occupant, the tertiary priority occupant, a quaternary priority occupant, and so forth, to determine the priority zone, the secondary zone, the tertiary zone, a quaternary zone, and so forth.

Upon identification of the respective priority occupants within the remaining zones of the building 10, the control system 102 may instruct the HVAC system 148 to condition these zones 126 in accordance with the predetermined climate preferences of these priority occupants. For example, in some embodiments, the first zone 120, the second zone 122, and the third zone 124 may respectively include a priority occupant, a secondary priority occupant, and a tertiary priority occupant. Accordingly, the first zone 120, the second zone 122, and the third zone 124 respectively correspond to the priority zone, the secondary priority zone, and the tertiary priority zone, in such an example. As such, the control system 102 may condition the first zone 120, the second zone 122, and the third zone 124 in accordance with the stored climate preferences of the priority occupant, the secondary priority occupant, and the tertiary priority occupant, respectively. In addition, the control system 102 may control the HVAC equipment 110 to distribute a predetermined percentage of a conditioned air supply provided by the HVAC system 148 to the first zone 120, the second zone 122, and the third 124 zone based on a priority level of the respective priority occupants. For example, in the present example, the control system 102 may instruct the HVAC equipment 110 to supply conditioned air to the first zone 120 at a first flow rate, supply conditioned air to the second zone 122 at a second flow rate, and supply conditioned air to the third zone 124 at a third flow rate. In some embodiments, the first flow rate is greater than the second flow rate, and the second flow rate is greater than the third flow rate. For example, the third flow rate may be a predetermined percentage of the second flow rate, which may be a predetermined percentage of the first flow rate. In other embodiments, the second and third flow rates are substantially equal to one another, and are both less than the first flow rate. That is, the second flow rate and the third flow rate may each be a substantially equal predetermined percentage of the first flow rate. In yet further embodiments, the first flow rate, the second flow rate, and the third flow rate may be substantially equal to one another. In certain embodiments, the control system 102 may detect a vacancy within certain zones of the building 10. That is, certain zones 126 of the building 10 may include no occupants currently located therein. In such embodiments, the zone controller 104 may supply conditioned air to the vacant zones(s) at a fourth flow rate. The fourth flow rate may be a predetermined percentage of the third flow rate or be substantially equal to the third flow rate. Alternatively, the fourth flow rate may be substantially zero, such that no conditioned air is supplied to the vacant zones(s). In some embodiments, the control system 102 may supply conditioned air to zones 126 having only unregistered occupants at the fourth flow rate.

Continuing through the embodiment of the process 170 shown in FIG. 8, the control system 102 may monitor whether an occupancy within the zones 126 changes over time, as indicated by step 184. For example, the zone controller 104 may receive continuous or intermittent feedback from the occupancy sensors 116 indicative of an occupancy within the zones 126. If the occupancy within the zones 126 remains unchanged, the control system 102 continues current operation of the HVAC system 148, such as operation in accordance with the process 170 described herein. If an occupancy within one or more of the zones 126 changes, such as when an occupant enters or leaves a particular zone of the building 10, the control system 102 may return to the step 174. Accordingly, the control system 102 may reevaluate a zone location of the priority occupant, a zone location of the secondary priority occupant, a zone location of the tertiary priority occupant, and so forth. In this manner, the control system 102 may adjust operation of the HVAC system 148 based on the updated locations of occupants within the building 10.

Technical effects of the control system 102 include improved resource allocation of the HVAC system 148 by prioritizing air flow to occupied zones within the building 10 and, in particular, prioritizing air flow to zones 126 having high priority occupants. For example, the control system 102 may reduce a time period involved in conditioning a zone having a high priority occupant by increasing a flow rate of conditioned air supplied to that zone and deceasing a flow rate of conditioned air supplied to remaining zones of the building 10 that may be unoccupied or contain occupants of a lower priority level. In addition, the control system 102 may improve an efficiency of the HVAC system 148 by mitigating air flow to unoccupied zones of the building 10. Accordingly, the control system 102 may enhance an operational efficiency of the HVAC system 148 and reduce an operational cost of the HVAC system 148.

As discussed above, the aforementioned embodiments of the control system 102 may be used on the HVAC unit 12, the residential heating and cooling system 50, the HVAC system 148, a rooftop unit, or in any other suitable HVAC system. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A heating, ventilation, and/or air conditioning (HVAC) system, comprising:
a controller configured to:
detect a presence of a registered occupant in a first zone of a plurality of zones;
determine a priority level of the registered occupant;
detect a presence of an unregistered occupant in a second zone of the plurality of zones; and
control operation of the HVAC system to direct a first predetermined percentage of an amount of conditioned air generated by the HVAC system to the first zone of the plurality of zones based on the priority level of the registered occupant and to direct a second predetermined percentage of the amount of conditioned air generated by the HVAC system to the second zone of the plurality of zones in response to detection of the unregistered occupant in the second zone, wherein the first predetermined percentage is greater than the second predetermined percentage such that the controller prioritizes distribution of conditioned air generated by the HVAC system to the first zone of the plurality of zones over the second zone of the plurality of zones.

2. The HVAC system of claim 1, wherein the controller is configured to determine the priority level of the registered occupant based on determination of an identification of the registered occupant.

3. The HVAC system of claim 2, wherein the controller is configured to receive a user input indicative of the priority level of the registered occupant, wherein the identification comprises the priority level.

4. The HVAC system of claim 2, comprising a mobile device configured to communicate the identification of the registered occupant to the controller.

5. The HVAC system of claim 1, wherein the controller is configured to direct an additional predetermined percentage of the amount of conditioned air generated by the HVAC system to remaining zones of the plurality of zones, wherein the additional predetermined percentage is less than the first predetermined percentage.

6. The HVAC system of claim 1, wherein the controller is further configured to:
   detect a presence of an additional registered occupant in a third zone of the plurality of zones; and
   determine a priority level of the additional registered occupant based on determination of an identification of the additional registered occupant.

7. The HVAC system of claim 6, wherein the controller is further configured to:
   compare the priority level of the registered occupant to the priority level of the additional registered occupant; and
   control operation of the HVAC system to direct a third predetermined percentage of the amount of conditioned air generated by the HVAC system to the third zone in response to determining that the priority level of the registered occupant is greater than the priority level of the additional registered occupant, wherein the third predetermined percentage is less than the first predetermined percentage and greater than the second predetermined percentage.

8. The HVAC system of claim 1, comprising an occupancy sensor disposed within the first zone, wherein the occupancy sensor is communicatively coupled to the controller and is configured to provide the controller with feedback indicative of the presence of the registered occupant.

9. The HVAC system of claim 1, wherein the controller is configured to detect the presence of the registered occupant in the first zone by detecting a presence of an electronic or non-electronic device of the registered occupant.

10. A heating, ventilation, and/or air conditioning (HVAC) system, comprising:
    a controller configured to:
      detect a presence of a plurality of occupants in a plurality of zones;
      identify one or more registered occupants of the plurality of occupants and one or more unregistered occupants of the plurality of occupants;
      determine a priority level of each registered occupant of the one or more registered occupants;
      determine a first zone of the plurality of zones having a priority occupant of the one or more registered occupants, the priority occupant having a highest priority level among the one or more registered occupants;
      determine a second zone of the plurality of zones having an unregistered occupant of the one or more unregistered occupants and devoid of registered occupants; and
      control operation of the HVAC system to supply a first predetermined percentage of an amount of conditioned air generated by the HVAC system to the first zone of the plurality of zones in response to detection of the priority occupant and to supply a second predetermined percentage of the amount of conditioned air generated by the HVAC system to the second zone of the plurality of zones in response to detection of the unregistered occupant, wherein the first predetermined percentage is greater than the second predetermined percentage such that the controller prioritizes conditioning of the first zone of the plurality of zones to a preferred climate setting of the priority occupant over conditioning of the second zone of the plurality of zones.

11. The HVAC system of claim 10, wherein the controller is configured to determine the priority level of each registered occupant of the one or more registered occupants based on determination of an identification of each registered occupant of the one or more registered occupants.

12. The HVAC system of claim 10, wherein the controller is further configured to:
    evaluate a user profile of the priority occupant to determine the preferred climate setting of the priority occupant; and
    control operation of the HVAC system to condition the first zone to a temperature specified in the preferred climate setting of the priority occupant.

13. The HVAC system of claim 12, wherein the controller has a display device, and wherein the controller is further configured to:
    generate a user interface on the display device prior to evaluating the user profile of the priority occupant; and
    receive a user input from the priority occupant indicative of the preferred climate setting of the priority occupant.

14. The HVAC system of claim 10, wherein the controller is configured to receive a user input from an administrator indicative of the priority level of each registered occupant of the one or more registered occupants.

15. The HVAC system of claim 14, wherein the priority level of each registered occupant of the one or more registered occupants is unique.

16. The HVAC system of claim 10, comprising one or more registration devices, wherein each registration device of the one or more registration devices is associated with a respective registered occupant of the one or more registered occupants, and wherein the one or more registration devices is configured to communicate a respective identification of each registered occupant of the one or more registered occupants to the controller.

17. A heating, ventilation, and/or air conditioning (HVAC) system, comprising:
a controller configured to:
    detect a presence of a first registered occupant in a first zone of a plurality of zones;
    detect a presence of a second registered occupant in a second zone of the plurality of zones;
    determine a first priority level of the first registered occupant and a second priority level of the second registered occupant based on an identification of the first registered occupant and an identification of the second registered occupant;
    identify a third zone of the plurality of zones having an unregistered occupant and devoid of registered occupants, wherein the unregistered occupant is unassociated with a corresponding identification; and
    control operation of the HVAC system to supply the first zone with a first predetermined percentage of an amount of conditioned air generated by the HVAC system, supply the second zone with a second predetermined percentage of the amount of conditioned air generated by the HVAC system, and supply the third zone with a third predetermined percentage of the amount of conditioned air generated by the HVAC system in response to determining that the first priority level exceeds the second priority level and identification of the third zone, wherein the first predetermined percentage is greater than the second predetermined percentage and the third predetermined percentage to prioritize conditioning of the first zone over the second zone and the third zone.

18. The HVAC system of claim 17, wherein the controller is further configured to:
    detect a vacancy in a fourth zone of the plurality of zones; and
    control operation of the HVAC system to supply the fourth zone with the third predetermined percentage of the amount of conditioned air generated by the HVAC system in response to determining the vacancy in the fourth zone.

19. The HVAC system of claim 17, further comprising:
    a first registration device configured to communicate the identification of the first registered occupant to the controller, and
    a second registration device configured to communicate the identification of the second registered occupant to the controller, wherein the first registration device, the second registration device, or both, comprise a cellular phone, a tablet, a laptop, a key fob, a magnetic strip card, a scannable bar code, or a combination thereof.

20. The HVAC system of claim 19, further comprising a plurality of occupancy sensors communicatively coupled to the controller, wherein the plurality of occupancy sensors is configured to detect the first registration device and the second registration device to communicate the identification of the first registered occupant and the identification of the second registered occupant to the controller.

* * * * *